Figure 1:
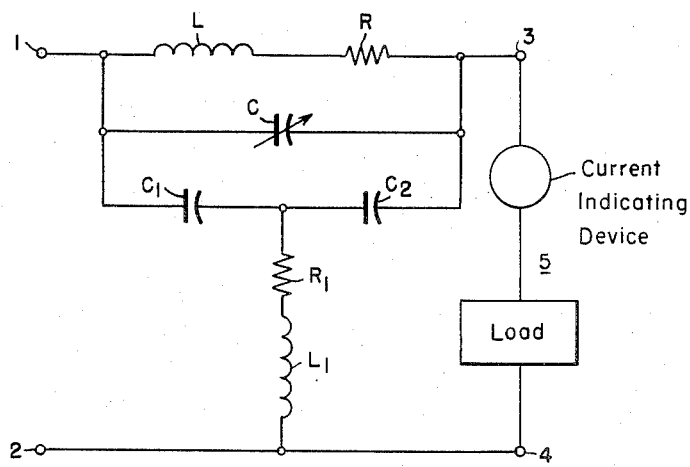

April 22, 1958   C. J. MILLER   2,832,047

TUNABLE BRIDGED-T NULL NETWORK

Filed Dec. 1, 1954

WITNESSES:
E. A. Miklosky
T. H. Murray

INVENTOR
Coleman J. Miller.
BY F. E. Browder
ATTORNEY

United States Patent Office 2,832,047
Patented Apr. 22, 1958

2,832,047

TUNABLE BRIDGED-T NULL NETWORK

Coleman J. Miller, Rock Hill Beach, Md., assignor to Westinghouse Electric Corporation, East Pittsburgh, Pa., a corporation of Pennsylvania Application December 1, 1954, Serial No. 472,455

3 Claims. (Cl. 324—128)

My invention relates to networks for alternating currents and, in particular, relates to tunable bridged-T null networks.

There are a number of applications in the field of alternating current circuits for null-type networks; that is to say, for networks which will have zero transfer admittance at some particular frequency. For example, paragraph 7 of Section 13 of Terman's Radio Engineers' Handbook, 1st ed., McGraw-Hill Book Company, New York, describes the use of such a network for measuring the inductance and Q of radio-frequency coils. However, their usefulness has been limited by the difficulty of maintaining the null adjustment at different frequencies. Thus, the Terman network can be adjusted to give a null at any impressed frequency, but to change from one frequency to another requires readjustment of at least two of the network elements, and in just a certain relative amount.

One principal object of my invention is to provide a null network of the bridged-T type in which the null adjustment may be changed from one frequency to another by altering a single control.

Another object is to provide an improved type of bridged-T null network which may be adjusted for a shift to different frequency of operation by adjusting a single control.

Another object is to provide such a network of a type which may have a relatively high input impedance.

Another object is to provide a network of the above-mentioned type in which the transfer characteristic does not vary markedly with departures from the null condition.

Still another object is to provide a network having a single control element in which other network elements of practicable type may be given such values as to permit tuning by adjusting said control to a perfect null at at least two selected frequencies, and yielding approximate null adjustments throughout the band between said selected frequencies.

Figure 2:
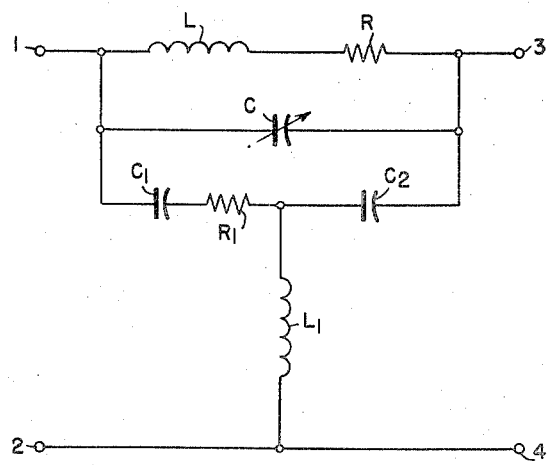

Other objects of my invention will become apparent upon reading the following description taken in connection with the drawing, in which:

Figure 1 is a schematic diagram of one type of network embodying the principles of my invention; and Fig. 2 is a similar diagram of another type of network embodying said principles.

Referring in detail to Fig. 1, a network embodying my invention comprises a pair of input terminals 1, 2, and a pair of output terminals 3, 4 supplying a load circuit 5. The terminals 1 and 3 are interconnected through an inductor L having a resistance of R at the frequency $f$ of an alternating voltage impressed on input terminals 1, 2. The terminals 1, 3 are also connected through an adjustable capacitor C shunted by a pair of fixed capacitors $C_1$ and $C_2$ serially joined. The mid-terminal of the capacitors $C_1$ and $C_2$ is connected to both terminals 2 and 4 by an inductor $L_1$ and a resistor $R_1$ which may be fixed values.

Mathematical analysis of this network by procedures well known in the radio art shows that the transfer admittance of this network across terminals 1, 2 with terminals 3, 4 short-circuit can be made zero for any impressed frequency $f$, provided certain relationships exist between the values of the network elements designated by letters in Fig. 1. One of these relationships may be expressed by the equation:

(1) $$mn - 2p(m+n) + \frac{(p^2+r^2)(m+n)^2}{mn} = rQ$$

where $$m = \frac{\text{reactance of } C_1}{\text{reactance of } L} = \frac{1}{(2\pi f)^2 L C_1}$$

$$n = \frac{\text{reactance of } C_2}{\text{reactance of } L} = \frac{1}{(2\pi f)^2 L C_2}$$

$$p = \frac{\text{reactance of } L_1}{\text{reactance of } L} = \frac{L_1}{L}$$

$$r = \frac{R_1}{\text{reactance of } L} = \frac{R}{2\pi f L}$$

$$Q = \frac{\text{reactance of } L}{\text{effective series resistance of } L} = \frac{2\pi f L}{R}$$

It will be noticed that the value of the adjustable capacitor C is not involved in Equation 1. An additional relationship, which does involve C and which is much more complicated than Equation 1 must also be fulfilled in order to make the transfer admittance at terminals 1, 2 zero; but, so long as Equation 1 is fulfilled, it is possible by merely adjusting C to attain a value which will make that transfer admittance zero (as shown, for instance, by zero reading of a detector short-circuiting terminals 3, 4); in other words, to adjust the network to the null condition. Hence, it is unnecessary, for practical purposes, to bother with this second relationship.

In the practical use of such a network, two of its components, such as L and R, may be constants of a circuit which are not subject to the user's control; in the Terman paragraph 7, for instance, they are the inductance and resistance of a coil to be measured. In employing my invention in the Fig. 1 network, it is desired to find a combination of values for C, $C_1$, $C_2$, $L_1$ and $R_1$ which will make the transfer admittance of the network zero (i. e., give zero current on a detector shorting terminals 3, 4). This means that the relationship expressed by Equation 1 must be fulfilled, and leaves four quantities $C_1$, $C_2$, $L_1$ and $R_1$ any one of which may be varied to do so. However, in many practical cases, the frequency $f$ of the voltage source may vary at one time or another between a pair of limits $f_1$ and $f_2$. Purely mathematical considerations would indicate that any four frequencies within the range $f_1$–$f_2$ might be selected at will and values of $C_1$, $C_2$, $L_1$ and $R_1$ be found which would allow Equation 1 to be satisfied. However, this might result in values of some of these quantities which it would be impossible or impracticable to employ; hence, it is usually better to choose practicable and convenient values for two of these four quantities, and then determine the other two by solving Equation 1 with the limiting values $f_1$ and $f_2$ of the expected frequency band substituted for $f$. This will give two simultaneous equations to solve for the two undetermined quantities. If $f_1$ and $f_2$ are reasonably near together, satisfactory nulls may be found at any impressed frequency within the range of $f_1$–$f_2$ by adjusting C to give zero current in a detector shunting 3—4. A network may then be composed of elements having the values thus determined, and capacitor C be adjusted until a detector short-circuiting terminals 3—4 gives a zero reading. A network having substantially zero transfer admittance may be produced by adjustment of the single control element of capacitor C throughout the entire frequency range $f_1$–$f_2$ will thus have been attained.

The above-mentioned computations involving $f_1$ and $f_2$ may be somewhat simplified if, instead of substituting the values $f_1$ and $f_2$ in Equation 1 the following equation in which $a$ represents the ratio $$\frac{f_1}{f_2}$$

be combined with Equation 1 for simultaneous solution to obtain values for the two undetermined network elements.

$$(2) \quad mna^4 - 2p(m+n)a^2 + \frac{(p^2+r^2a^2)(m+n)^2}{mn} = raQ^2$$

However, Equation 2 applies only if Q has the same value at frequencies $f_1$ and $f_2$. If this condition is not fulfilled, then the more complicated computations using only Equation 1 must be employed.

Fig. 2 shows another form of network in which zero transfer admittance may be attained at any impressed frequency within a predetermined range by simply adjusting a single control element. It differs from the Fig. 1 network in that the resistor R, is transferred from the vertical leg of the network where it is in series with L, to the lower horizontal leg where it is in series with $C_1$ or $C_2$. Otherwise, Fig. 2 is similar to Fig. 1, both as to its form and the method of adjusting its capacitor C. However, the relationship represented by Equations 1 and 2 will not be directly applicable to the Fig. 2 network; but the analogous relations required to produce zero transfer admittance in the Fig. 2 network may be calculated by methods well known in the radio art.

I claim as my invention:

1. A network having a first input terminal and a first output terminal, a single inductance L and a substantial resistance R in series connecting said first input and output terminals, a capacitance C in parallel with said inductance L and resistance R for coupling said first input and output terminals, an electron path including a pair of capacitances $C_1$ and $C_2$ in series coupling said first input and output terminals, a common input and output terminal for said network, and an electron path including an inductance $L_1$ and resistance $R_1$ connecting said common terminal to said first-mentioned electron path at a point intermediate said capacitances $C_1$ and $C_2$, said network fulfilling the relation $$mn - 2p(m+n) + \frac{(p^2+r^2)(m+n)^2}{mn} = rQ$$

where $$m = \frac{\text{reactance of } C_1}{\text{reactance of } L} = \frac{1}{(2\pi f)^2 LC_1}$$

$$n = \frac{\text{reactance of } C_2}{\text{reactance of } L} = \frac{1}{(2\pi f)^2 LC_2}$$

$$p = \frac{\text{reactance of } L_1}{\text{reactance of } L} = \frac{L_1}{L}$$

$$r = \frac{R_1}{\text{reactance of } L} = \frac{R_1}{(2\pi f L)}$$

$$Q = \frac{\text{reactance of } L}{\text{effective series resistance of } L} = \frac{2\pi f L}{R}$$

and $f$ is frequency of a sinusoidal voltage impressed between said input terminal and said common input and output terminal.

2. A network having a first input terminal and a first output terminal, a single inductance L and a substantial resistance R in series connecting said first input and output terminals, a capacitance C in parallel with said inductance L and resistance R for coupling said first input and output terminals, the value of said capacitance C being adjustable at will, an electron path including a pair of capacitances $C_1$ and $C_2$ in series coupling said first input and output terminals, a common input and output terminal for said network, and an electron path including an inductance $L_1$ and resistance $R_1$ connecting said common terminal to said first-mentioned electron path at a point intermediate said capacitances $C_1$ and $C_2$, said network fulfilling the relation $$mn - 2p(m+n) + \frac{(p^2+r^2)(m+n)^2}{mn} = rQ$$

where $$m = \frac{\text{reactance of } C_1}{\text{reactance of } L} = \frac{1}{(2\pi f)^2 LC_1}$$

$$n = \frac{\text{reactance of } C_2}{\text{reactance of } L} = \frac{1}{(2\pi f)^2 LC_2}$$

$$p = \frac{\text{reactance of } L_1}{\text{reactance of } L} = \frac{L_1}{L}$$

$$r = \frac{R_1}{\text{reactance of } L} = \frac{R_1}{(2\pi f L)}$$

$$Q = \frac{\text{reactance of } L}{\text{effective series resistance of } L} = \frac{2\pi f L}{R}$$

and $f$ is frequency of a sinusoidal voltage impressed between said input terminal and said common input and output terminal.

3. A network having a first input terminal and a first output terminal, a single inductance L and a substantial resistance R in series connecting said first input and output terminals, a capacitance C in parallel with said inductance L and resistance R for coupling said first input and output terminals, an electron path including a pair of capacitances $C_1$ and $C_2$ in series coupling said first input and output terminals, a common input and output terminal for said network, an electron path including an inductance $L_1$ and resistance $R_1$ connecting said common terminal to said first-mentioned electron path at a point intermediate said capacitances $C_1$ and $C_2$, and current-indicating means of low impedance interconnecting said output terminal with said common input and output terminal, said network fulfilling the relation $$mn - 2p(m+n) + \frac{(p^2+r^2)(m+n)^2}{mn} = rQ$$

where $$m = \frac{\text{reactance of } C_1}{\text{reactance of } L} = \frac{1}{(2\pi f)^2 LC_1}$$

$$n = \frac{\text{reactance of } C_2}{\text{reactance of } L} = \frac{1}{(2\pi f)^2 LC_2}$$

$$p = \frac{\text{reactance of } L_1}{\text{reactance of } L} = \frac{L_1}{L}$$

$$r = \frac{R_1}{\text{reactance of } L} = \frac{R_1}{(2\pi f L)}$$

$$Q = \frac{\text{reactance of } L}{\text{effective series resistance of } L} = \frac{2\pi f L}{R}$$

and $f$ is frequency of a sinusoidal voltage impressed between said input terminal and said common input and output terminal.

References Cited in the file of this patent

UNITED STATES PATENTS

| | | |
|---|---|---|
| 2,585,842 | Richardson | Feb. 12, 1952 |
| 2,762,018 | Purington | Sept. 4, 1956 |